(12) United States Patent
Teng et al.

(10) Patent No.: US 9,173,217 B2
(45) Date of Patent: Oct. 27, 2015

(54) BASE STATION CALIBRATION (75) Inventors: Fan Teng, Hangzhou Zhejiang (CN);
Chao Wei, Beijing (CN); Gang Zeng,
Beijing (CN); Yufang Yin, Shanghai
(CN); Xuegang Huang, Beijing (CN)

(73) Assignee: Nokia Solutions and Networks Oy,
Espoo (FI)

( * ) Notice: Subject to any disclaimer, the term of this
patent is extended or adjusted under 35
U.S.C. 154(b) by 239 days.

(21) Appl. No.: 13/701,543

(22) PCT Filed: Jun. 3, 2010

(86) PCT No.: PCT/CN2010/000788
§ 371 (c)(1),
(2), (4) Date: Jul. 29, 2013

(87) PCT Pub. No.: WO2011/150533
PCT Pub. Date: Dec. 8, 2011

(65) Prior Publication Data
US 2013/0303216 A1    Nov. 14, 2013

(51) Int. Cl.
*H04B 1/04*     (2006.01)
*H04W 72/04*    (2009.01)
*H01Q 1/24*     (2006.01)
*H01Q 3/26*     (2006.01)
*H03C 1/62*     (2006.01)

(52) U.S. Cl.
CPC ........... *H04W 72/0433* (2013.01); *H01Q 1/246*
(2013.01); *H01Q 3/267* (2013.01)

(58) Field of Classification Search
CPC ..................................................... H04W 16/28
USPC ........................................... 455/114.3, 562.1
See application file for complete search history.

(56) References Cited

U.S. PATENT DOCUMENTS

| 7,079,866 B2 | 7/2006 | Takano ......................... 455/561 |
| 2002/0155818 A1* | 10/2002 | Boros et al. .................. 455/67.4 |
| 2005/0239419 A1 | 10/2005 | Fudaba et al. ................ 455/101 |
| 2006/0111050 A1 | 5/2006 | Choi et al. .................. 455/67.11 |
| 2007/0149251 A1 | 6/2007 | Jeon ........................... 455/562.1 |

FOREIGN PATENT DOCUMENTS

| CN | 1446000 A | 10/2003 |
| CN | 101686075 A | 3/2010 |
| JP | 2003143047 A | 5/2003 |
| JP | 2005123811 A | 5/2005 |
| JP | 2007096775 A | 4/2007 |
| WO | WO-2004109952 A1 | 12/2004 |
| WO | WO 2009/019526 A1 | 2/2009 |

* cited by examiner

*Primary Examiner* — Lee Nguyen
(74) *Attorney, Agent, or Firm* — Harrington & Smith (57) ABSTRACT

A method for calibrating a base station including a plurality of antennas is provided. First correction information is received from a system module, the correction information determined from first calibration of the base station Signals are received at a radio frequency module from at least one antenna of the base station Second correction information is determined on the basis of the received signals and the first correction information.

26 Claims, 8 Drawing Sheets

BASE STATION CALIBRATION

The invention relates to calibrating a base station comprising a plurality of antennas A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3$^{rd}$ Generation Partnership Project (3GPP). The various development stages of the 3GPP LTE specifications are referred to as releases. The aim of the standardization is to achieve a communication system with, inter alia, reduced latency, higher user data rates, improved system capacity and coverage, and reduced cost for the operator.

A feature of the LTE system is that the multiple antennas may be used for carrying out beamforming. Beamforming is a signal processing technique used to separate a particular signal from other signals in a multiple in multiple out (MIMO) system. A system performing beamforming weights and sums signals from the different antennas to optimise the quality of the received or transmitted signal. For example, beamforming can achieve interference rejection, multipath fading mitigation and increase the antenna gain in a particular direction.

When multiple antennas are used for beamforming, an accurate determination of the characteristics of the antennas is required. For example, in order to satisfactorily carry out beamforming characteristics such as phase, amplitude, delay must be determined accurately.

Typically the characteristics such as amplitude, phase and delay of multiple antennas are determined during calibration of the base station. The characteristics determined from calibrating the base station may be used to calculate appropriate sets of beamforming weights which are used to compensate a signal transmitted or received from the base station.

The demands for increased capacity of communication networks has meant that solutions for increasing the capacity of LTE broadband systems is desired. In some LTE broadband systems a channel may typically have a bandwidth of 20 MHz. Such a wide bandwidth requires an even more accurate determination of the characteristics of multiple antennas before beamforming may be optimised. It has been noted that some radio frequency components of the base station may have frequency selective characteristics which may make calibration even more difficult.

One known calibration method requires that a baseband unit (BBU) and a remote radio unit (RRU) of the base station are used together during runtime of the base station. The BBU communicates with the RRU over an Ir interface, for example during the calibration. However the Ir interface may require adaptation before the calibration can be performed with the BBU and the RRU due to different manufactures' specifications and the adaptation may be complicated and time consuming.

Another known calibration method requires using only the RRU to carry out the calibration during runtime of the base station. This calibration method requires significant calculations to be performed at the RRU which is costly because the hardware requirements of the RRU are greatly increased.

It is noted that the above discussed issues are not limited to any particular communication environment, but may occur in any appropriate communication system where tight accuracy on phase, amplitude and delay are required.

Embodiments of the invention aim to address one or several of the above issues.

In accordance with an embodiment there is provided a method of calibrating a base station comprising a plurality of antennas, the method comprising:
 receiving first correction information from a system module, the correction information determined from a first calibration of the base station;
 receiving at a radio frequency module signals received from at least one antenna of the base station; and
 determining second correction information on the basis of the received signals and the first correction information.

Preferably, the method comprises: receiving a training sequence from the system module; and sending the training sequence to the at least one antenna of the base station.

In accordance with a more detailed embodiment the receiving the first correction information may comprise receiving correction information for correcting signal distortions or a training sequence modified on the basis of the correction information.

Preferably the correction information comprises an error vector. The first correction information may be for correcting a fixed error and the second correction information is for correction a variable error. The first correction information may be determined during start up of the base station and the second correction information may be determine after start up of the base station.

Preferably the received signals from the at least one antenna is a training sequence comprising signal distortions.

In accordance with a more detailed embodiment the characteristics of the received signals may be measured in response to the training sequence. Preferably the determining the second correction information comprises estimating the error distortion of the signals on the basis of the measurements.

Preferably the training sequence is a start-up training sequence and/or a runtime training sequence. Preferably characteristics of the received signals are measured in response to the start-up training sequence.

Preferably error distortion of the signals is estimated on the basis of the measurements. Preferably the measuring the characteristics and/or estimating the error distortion are carried out at the system module or the radio frequency module.

Preferably the determining the first correction information is on the basis of the estimated error distortion.

Preferably the first and second correction information is for compensating for characteristics of at least one of the plurality of the antennas distorting transmissions.

Preferably the method comprises: compensating signals received/transmitted from the base station on the basis of the second correction information and/or the first correction information.

Preferably the compensating the signals on the basis of the second correction information is carried out at the radio frequency module.

Preferably the compensating the signals on the basis of the first correction information is carried out at the radio frequency module or the system module.

Preferably the method comprises: repeating receiving the signals from the at least one antenna and determining the second correction information. Preferably the repeating is over a configurable time or time slot.

Preferably the method comprises receiving first correction information for a first number of subbands and determining second correction information for a second number of subbands. Preferably the first number of subbands is greater than the second number of subbands. Preferably the bandwidth of at least one suband of the first number of subbands is smaller that the bandwidth of at least one subband of the second number of subbands.

Preferably the determining comprises determining on or more of amplitude errors, phase errors or latency errors of signals.

Preferably the runtime training sequence and/or the start-up training sequence is sent on a plurality of subbands in sequence or in parallel.

Preferably the system module is one of a baseband unit and factory testing unit. Preferably the radio frequency module is a remote radio unit. Preferably the base station is an eNode B.

Preferably the determining second correction information on the basis of the received signals and the first correction information is a second calibration. More preferably the first calibration is carried out once. The first calibration may be carried out on start-up of the base station. Preferably the second calibration is repeated a plurality of times. The second calibration may be carried out during runtime of the base station.

Preferably the second calibration is performed by only the radio frequency module. Preferably the first calibration is carried out by the radio frequency module optionally with the system module. Preferably the system module carries out the first calibration on the basis of implementation requirements.

A computer program comprising program code means adapted to perform the method may also be provided.

In accordance with yet another embodiment there is provided an apparatus comprising a processor; memory including computer program code; the memory and the computer program code configured to, with the processor, cause the apparatus to perform at least the following: receive first correction information from a system module, the correction information determined from a first calibration of the base station; receive at a radio frequency module signals received from at least one antenna of the base station; and determine second correction information on the basis of the received signals and the first correction information. The apparatus may be a control apparatus.

In accordance with another embodiment there is an apparatus comprising:
receiving means for receiving first correction information from a system module, the correction information determined from a first calibration of the base station;
receiving means for receiving at a radio frequency module signals received from at least one antenna of the base station; and
determining means for determining second correction information on the basis of the received signals and the first correction information.

Various other aspects and further embodiments are also described in the following detailed description and in the attached claims.

The invention will now be described in further detail, by way of example only, with reference to the following examples and accompanying drawings, in which.

In the following certain exemplifying embodiments are explained with reference to wireless or mobile communication systems serving mobile communication devices. Before explaining in detail the certain exemplifying embodiments, certain general principles of a wireless communication system and mobile communication devices are briefly explained with reference to FIG. 1 to assist in understanding the technology underlying the described examples.

A communication device can be used for accessing various services and/or applications provided via a communication system. In wireless or mobile communication systems the access is provided via a wireless access interface between mobile communication devices 11 and an appropriate access system 10. A mobile device 11 can typically access wirelessly a communication system via at least one base station 12 or similar wireless transmitter and/or receiver node of the access system. A base station site typically provides one or more cells of a cellular system. In the FIG. 1 example the base station 12 is configured to provide a cell, but could provide, for example, three sectors, each sector providing a cell. Each mobile device 11 and base station 12 may have one or more radio channels open at the same time and may receive signals from more than one source.

Figure 1:
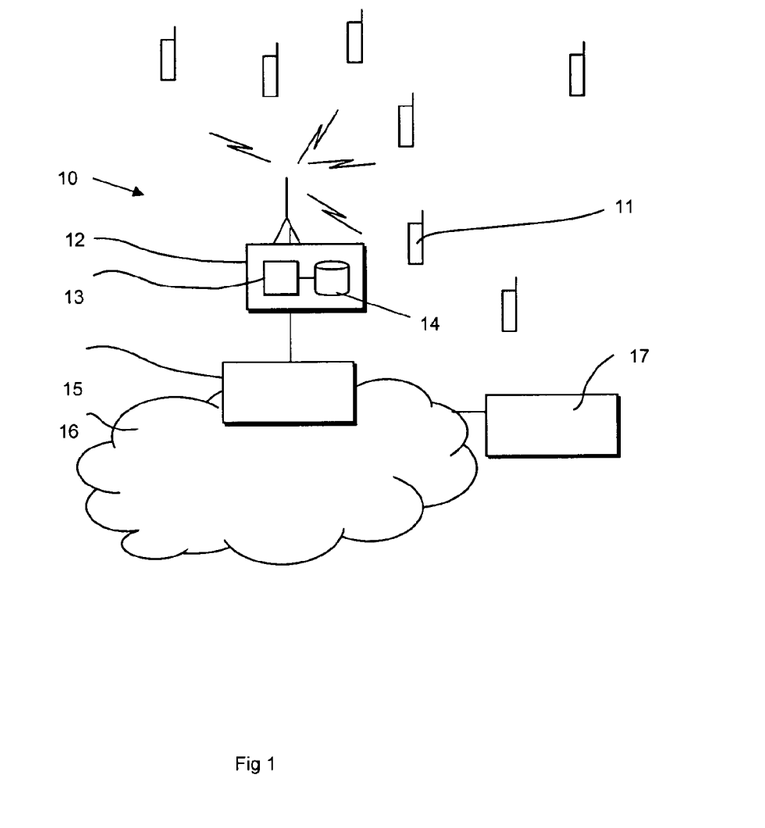
FIG. 1 shows an example of a communication system in which the embodiments of the invention may be implemented.

A base station 12 is typically controlled by at least one appropriate controller so as to enable operation thereof and management of mobile communication devices in communication with the base station. The control entity can be interconnected with other control entities. In FIG. 1 the controller is shown to be provided by block 13. The controller is thus typically provided with memory capacity and at least one data processor. It shall be understood that the control functions may be distributed between a plurality of controller units. The controller apparatus for the base station 12 may be configured to execute an appropriate software code to provide the control functions as explained below in more detail.

In the FIG. 1 example the base station node 12 is connected to a data network 16 via an appropriate gateway 15. A gateway function between the access system and another network such as a packet data network may be provided by means of any appropriate gateway node, for example a packet data gateway and/or an access gateway 17. A communication system may thus be provided by one or more interconnect networks and the elements thereof, and one or more gateway nodes may be provided for interconnecting various networks.

A communication device can be used for accessing various services and/or applications. The communication devices can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN).

Non-limiting examples of appropriate access nodes are a base station of a cellular system, for example what is known as NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices.

Other examples include base stations of systems that are based on technologies such as wireless local area network (WLAN) and/or WiMax (Worldwide Interoperability for Microwave Access).

An appropriate mobile communication device may be provided by any device capable of sending and receiving radio signals. Non-limiting examples include a mobile station (MS) such as a mobile phone or what is knows as a 'smart phone', a portable computer provided with a wireless interface card or other wireless interface facility, personal data assistant (PDA) provided with wireless communication capabilities, or any combinations of these or the like. A mobile communication device may be used for voice and video calls, for accessing service applications provided via a data network.

Figure 2:
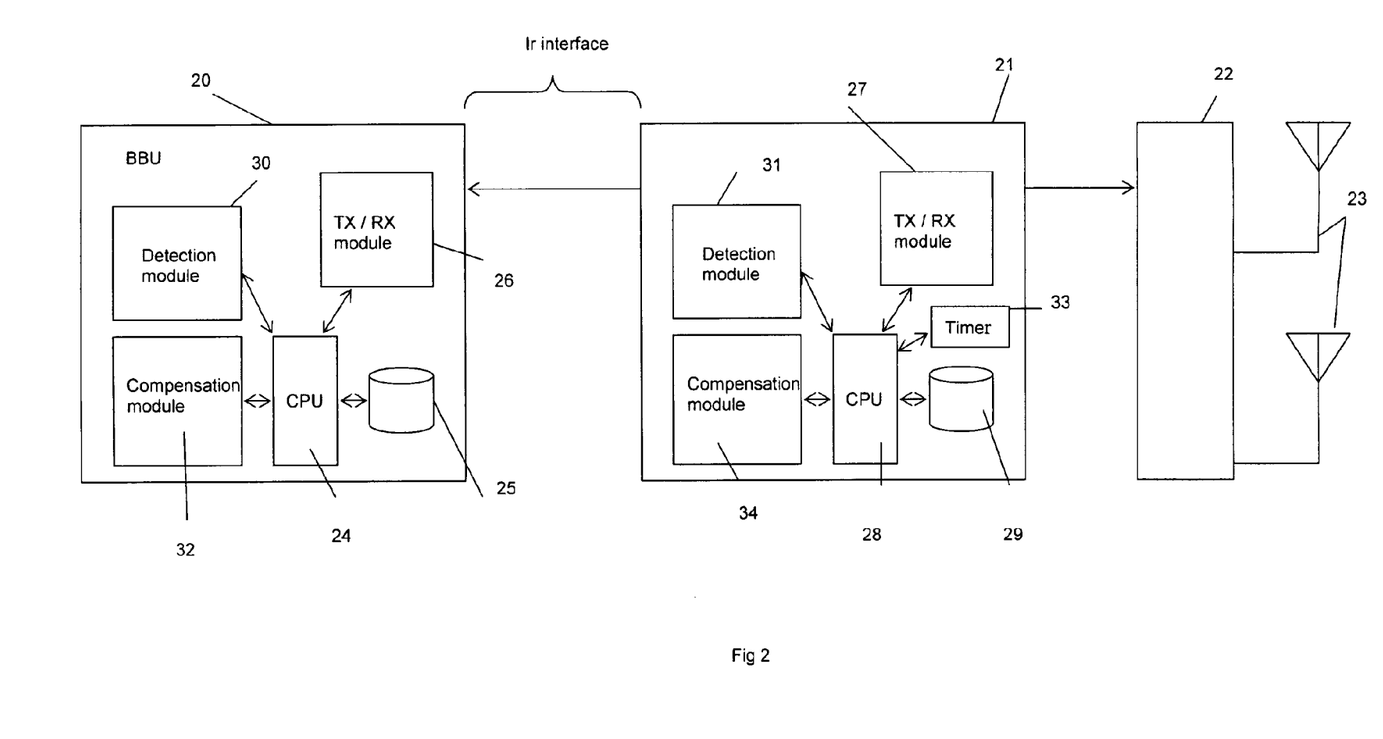
FIG. 2 shows an example of a base station.

The base station 12 will now be described in further detail with reference to FIG. 2. FIG. 2 discloses a base station 12 according to some embodiments. The base station 12 comprises a system module 20. The system module 20 may be a base band unit (BBU) which performs system operations such as communicating with a core network. The system module 20 communicates with a radio frequency module 21 over an Ir interface. The radio frequency module may be a remote radio unit (RRU). The radio frequency module 21 converts base band signals into a format suitable for transmission over a wireless network. The radio frequency module sends signals for wireless transmissions to an antenna system 22. The antenna system 22 comprises a plurality of antennas 23. In some embodiments the radio frequency module is separate from the system module, however alternatively the radio frequency module and the system module may be comprised in the same network entity. In some other embodiments the antenna system 22 and the radio frequency module 21 may be comprised in the same network entity. The plurality of antennas may be used together for the purposes of beam forming wireless transmissions.

Some radio frequency hardware subcomponents may demonstrate characteristics which are frequency selective in both phase and amplitude. The frequency selective characteristics introduce an error which distorts signals received or transmitted by the base station.

Figure 6:
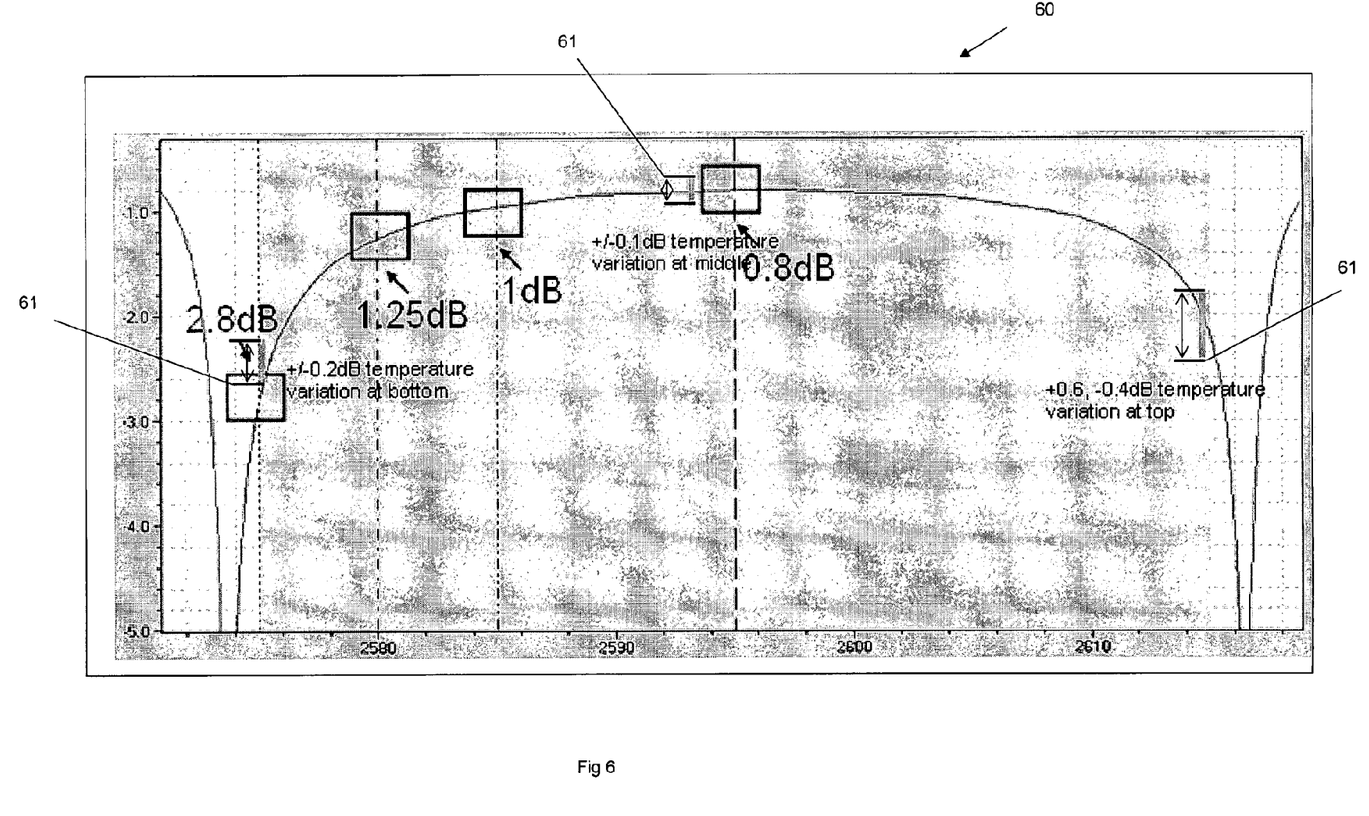
FIG. 6 shows an exemplary graph of signal loss against frequency due to one or more components of the base station.

FIG. 6 discloses an exemplary graph of signal loss against frequency due to one or more radio frequency hardware subcomponents. In particular, FIG. 6 illustrates a radio frequency filter subcomponent causing frequency selective variances in the base station. The subcomponent can be other electronic hardware causing a frequency selective variance. The shaded region 60 is the frequency band over which the subcomponent, which in this case is a filter, operates. In some instances the filter causes an insertion loss ripple in amplitude point over 5 MHz up to 1.55 (±0.77) dB, over 10 MHz up to 1.8 (±0.9) dB and over 20 MHz up to 2 (±1) dB. The filter may also cause phase ripples which are also significant to operation of the base station. The large amplitude and phase errors due to the filter may cause an unexpected radiation pattern which means the base station may not be able to form a particular beam in a particular direction with a certain power level. In this way, beam forming may be impeded due to at least frequency selective characteristics of the hardware subcomponents of the base station.

FIG. 6 is illustrative and shows an exemplary frequency selective variation for a particular physical filter. The selective characteristics may change depending on components and other factors.

FIG. 6 illustrates frequencies selective characteristics for a particular hardware component such as a filter. The insertion loss ripple caused by the filter can be considered as having error in the received/transmitted signals, the error comprising a static first part and a variable second part. The static first part of the error is typically static once the hardware components such as the filter is made and assembled. For example, referring to FIG. 6 the value such as 2.8 dB, 1.25 dB, 1 dB and 0.8 dB are static frequency selective characteristics of the hardware component.

The second part of the error varies over time. For example the error may vary due to environmental factors such as temperature fluctuations. Other factors may also affect the variable frequency selective characteristics such as humidity, pressure and other weather phenomenon. FIG. 6 shows the error variation 61 at three separate parts of the frequency sub-band. The variance for example may vary + or −0.2 dB at the lower end of the frequency sub-band, + or −0.1 dB at the middle of the frequency sub-band and vary between +0.6 and −0.4 dB at the top of the frequency sub-band.

Calibration of the base station at a time of initiating the base station and also during operation of the base station may overcome amplitude and phase errors due to hardware components of the base station. Indeed the static and variable errors may be compensated according to some of the embodiments described hereinafter.

FIG. 2 illustrates a base station according to some embodiments which is configured to be calibrated for static errors and for variable errors.

Figure 3:
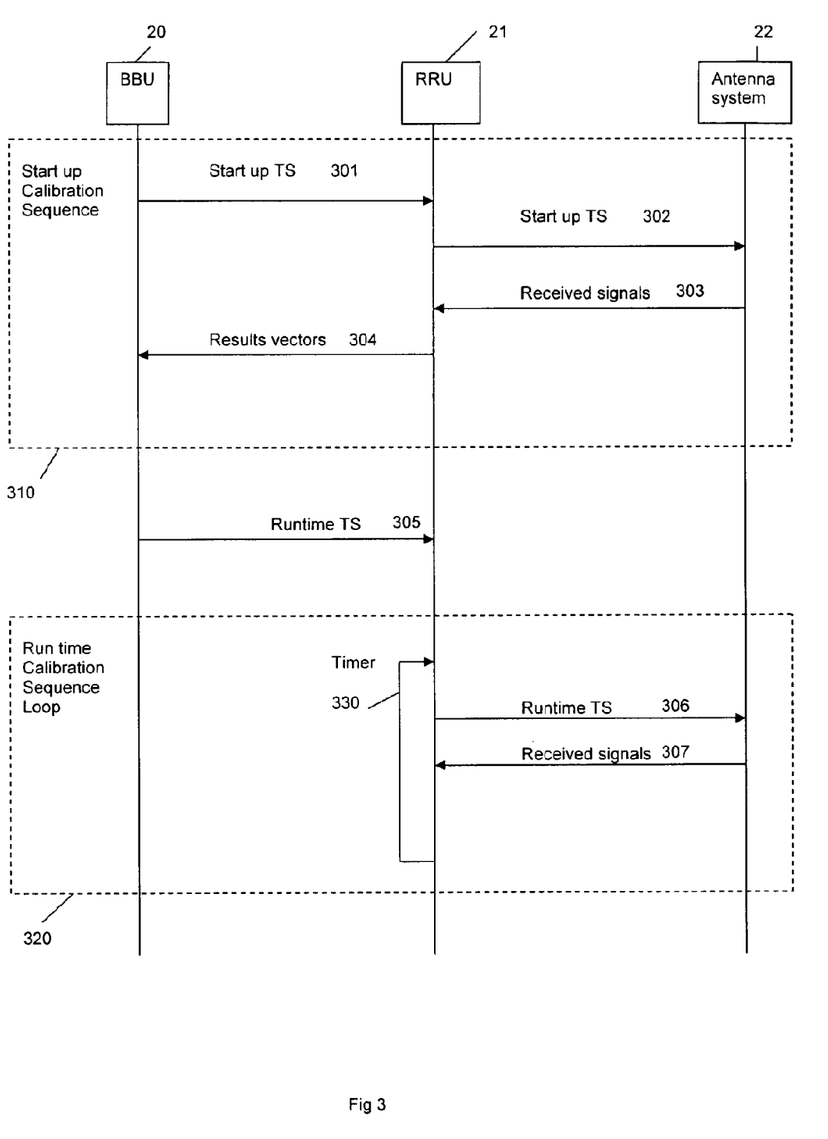
FIG. 3 shows a signaling diagram between different elements of the base station according to some embodiments.
Figure 4:
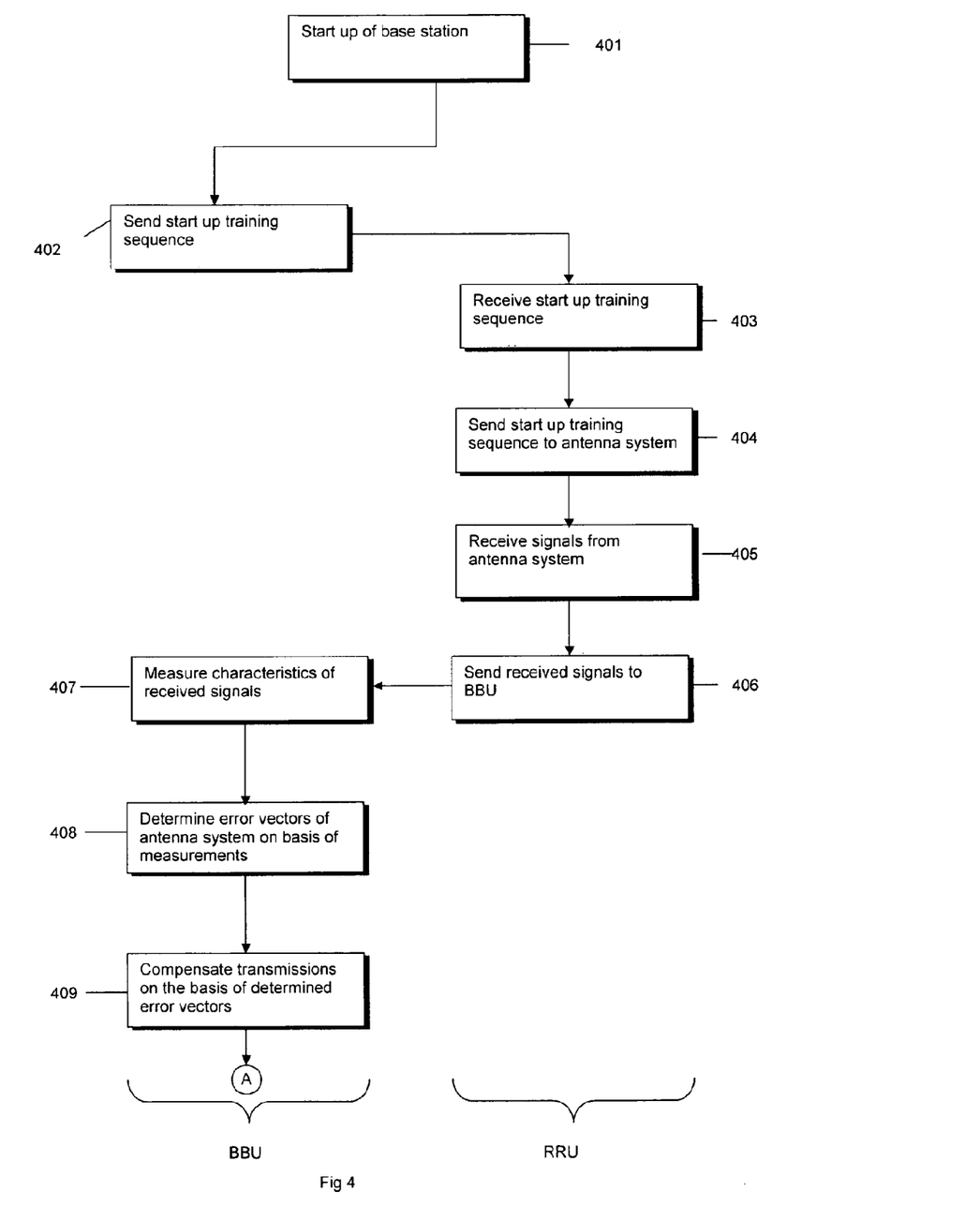
FIGS. 4 illustrates a flowchart for a method of start-up calibration according to certain embodiments.

Some embodiments which carry out a frequency selective start-up calibration procedure will now be described with reference to FIGS. 2, 3 and 4. FIG. 3 illustrates a signalling diagram between the system module 20, the radio frequency module 21 and the antenna system 22. FIG. 4 illustrates a flow diagram for the method of calibration at start-up according to some embodiments. In some embodiments, the start-up calibration procedure occurs on initialisation or start-up of the base station. The start-up calibration sequence is shown in box 310 of FIG. 3.

On start-up of the base station 12, as shown in step 401 of FIG. 4, the fixed error of the base station 12 is determined by the system module 20. The system module 20 comprises a processor 24 which obtains a start-up training sequence from storage means 25. The storage means 25 may be a memory comprised within the system module 20. In some embodiments the memory may be a storage means remote from the system module 20.

After start-up of the base station as shown in step 401, the processor 24 of the system module sends the start-up training sequence to the radio frequency module 21 using the transmitting/receiving module 26 as shown in step 301 of FIG. 3 and step 402 of FIG. 4.

The start-up training sequences is configured for a narrow sub-band. In some embodiments the start-up training sequences are used for sub-bands having a bandwidth of 180 KHz. In some embodiments the training sequences are generated by the system module 20 according to predetermined algorithms.

Before step 402 the processor 24 determines the number of sub-bands that the base station 12 is to be calibrated over for the start-up calibration procedure. The number of sub-bands may be determined by the processor 24 on the basis of performance, processing delay and computational complexity. Furthermore the processor 24 determines the length of the start-up training sequence on the basis of performance, processing delay and computational complexity as well. In some embodiments the processor 24 of the system module 20 determines the number of sub-bands to be covered by the start-up training sequence and the length of the training sequence on the basis of determined limitations of the software and hardware. In this way, the processor 24 determines a particular start-up training sequence without requiring upgrading the software or hardware of the base station. In other embodiments the processor 24 obtains start-up training sequences from memory.

The processor 24 in some embodiments may select a start-up training sequence which is longer than a runtime training sequence because the timing restraints of the start-up procedure are less restrictive. This means that processing delay of the start-up calibration procedure may be accommodated if a start-up training sequence is used which is longer than a runtime training sequence.

In some embodiments the start-up training sequence is sent from the transmitting/receiving module 26 to the radio frequency module 21 at a predetermined time, for example the system module 20 and the radio frequency module 21 are configured to respectively send and receive in a guard period.

The radio frequency module 21 receives the start-up training sequence in a transmitting/receiving module 27 as shown in step 403 of FIG. 4. The radio frequency module 21 communicates with the system module 20 over an Ir interface. The Ir interface may be a common public radio interface (CPRI), an open base station architecture initiative interface (OBSAI) or an open radio interface (ORI). When the transmitting/receiving module 27 receives the start-up training sequence a processor 28 of the radio frequency module 21 may store the start-up training sequence in memory 29. The memory 29 of the radio frequency module 21 may be comprised in the radio frequency module 21 or alternatively may be remote from the radio frequency module 21.

The radio frequency module then sends the training sequence to the antenna system 22 as shown in steps 403 of FIGS. 4 and 302 of FIG. 3. The transmitting/receiving module 27 is configured to send and receive signals to and from both the system module 20 and the antenna system 22. In some embodiments the transmitting/receiving module 27 of the radio frequency module comprise a first part for transmitting/receiving information from the system module over the Ir interface and a second part for transmitting/receiving information to the antenna system.

The radio frequency module 21 sends the start-up training sequence to a calibration loop of each transmitting/receiving pipe at a given power level. A transmitting/receiving pipe is a radio frequency chain which comprises a plurality of radio frequency components which sends and/or receives signals. This means that the start-up training sequence is sent from at least one of a plurality of the radio frequency transmitting chains 23 and is looped back by an antenna calibration network and received by at least one of a plurality of radio frequency receiving chains 23. FIG. 2 shows only two antennas but there may be any number of antennas at a base station. The start-up training sequence may be sent and received from any combination of the plurality of antennas at the base station 12. In this way, the antenna system will receive a training sequence as transmitted by another of the antennas and the start-up training sequence will be distorted due to the characteristics of the hardware and software of the base station. The received signals from the antenna system 22 are sent from the antenna system to the radio frequency module 21 as shown in step 303 of FIG. 3 and in step 405 of FIG. 4.

The antenna system 22 may send and receive the start-up training sequence on different sub-bands and for different transmitting/receiving pipes in parallel or alternatively in sequence. Alternatively in some embodiments the start-up training sequence may be sent and received in any order of different sub-bands and different pipes.

The radio frequency module 21 then sends the received signals to the system module 30 as shown in step 304 of FIG. 3 and step 406 of FIG. 4. The processor 24 of the system module 20 sends the received signals received at the transmitting/receiving module 26 to a detection module 30. The detection module 30 measures the characteristics of the received signals as shown in step 407 and estimates the amplitude, phase and/or latency errors of the received signals. The detection module 30 sends the estimated measurements to the processor 24 and the processor determines the error vectors of the antenna system on the basis of the determined measurement as shown in step 408 of FIG. 4. The processor 24 determines the error vectors for each configuration of sub-band and transmitting/receiving pipe.

In some embodiments, the radio frequency module 21 sends the received signals to a detection module 31 in the radio frequency module 21. If the detection module 31 of the radio frequency module 21 measures the amplitude, phase, and/or latency errors of the received signals, the processor 28 of the radio frequency module 21 determines the error vectors of the antenna system on the basis of the determined measurements. The radio frequency module 21 then sends the error vectors over the Ir interface to the system module 20.

The processor 24 of the system module 20 sends the error vectors to the compensation module 32 and the compensation module determines correction information. In some embodiments the correction information is anti-error vectors based on the error vectors. The anti-error vector when applied to a transmission for sending or receiving via the base station 12 compensates for the variation determined in the start-up calibration procedure.

The compensation module 32 applies the anti-error vector to every single downlink data transmission to compensate the fixed error due to the static frequency selective characteristics of the radio frequency module as shown in step 409 of FIG. 4. The processor 24 may store the anti-error vectors in memory 25 for compensating downlink data transmissions after start-up.

Figure 8:
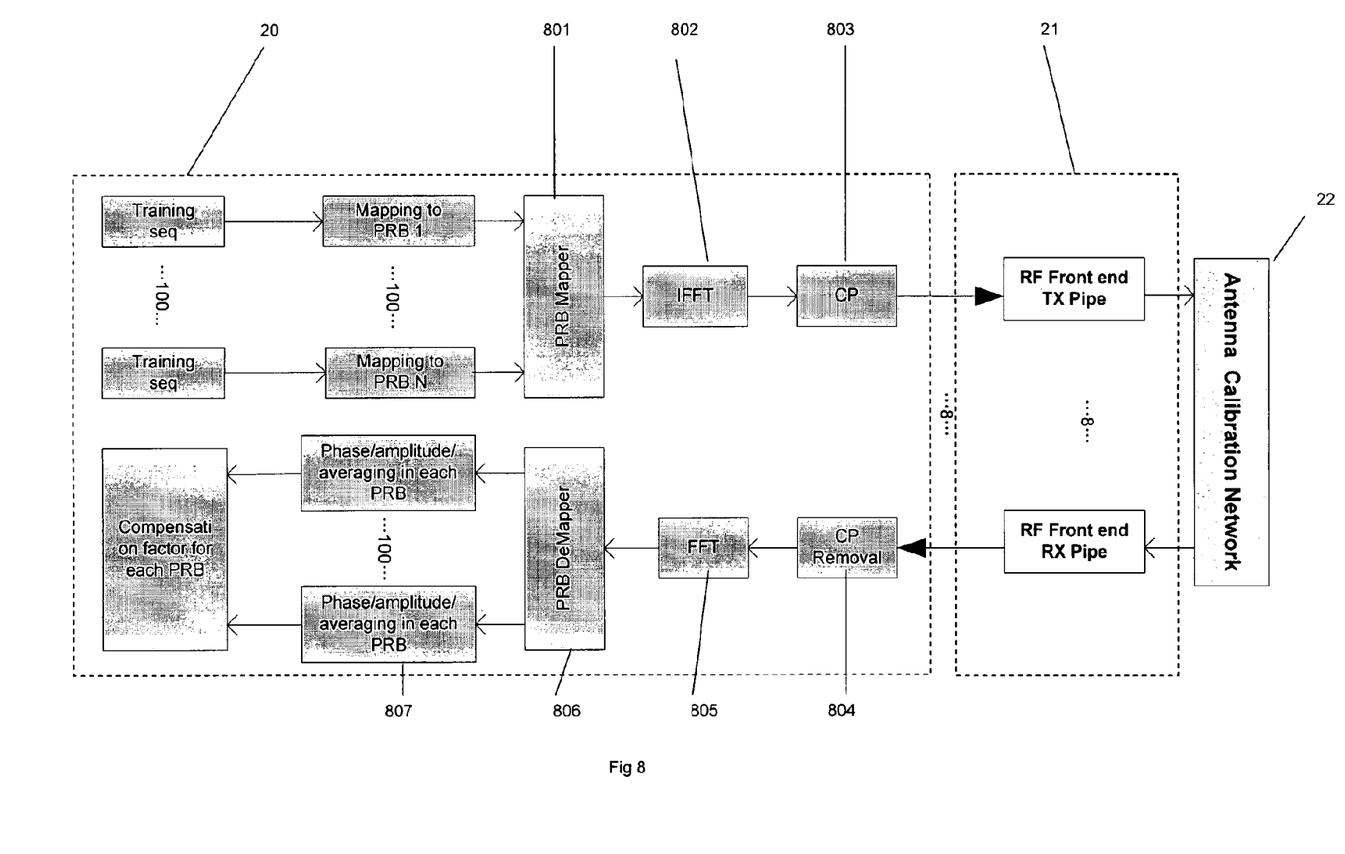
FIG. 8 shows a flowchart for start-up calibration according to some other embodiments.

The start-up calibration procedure will now be described in reference to FIG. 8 which discloses a more detailed algorithm of the start-up calibration procedure. FIG. 8 shows blocks of the algorithm which are carried out within the system module 20 and blocks which are carried out at the radio frequency module 21.

The processor 24 maps a training sequence to a physical resource block using a physical resource block mapper 801. The processor 24 then carries out an inverse fast Fourier transform 802 on the training sequence. The processor 24 then adds a cyclic prefix 803 to the training sequence. The training sequence is then sent to the radio frequency module 21 and the steps are carried out as discussed previously and shown in FIGS. 3 and 4.

When the system module 20 receives the distorted training sequence received from the antenna system 22 via the radio frequency module 21 the processor 24 removes the cyclic prefix as shown in step 804. The processor then carries out a fast Fourier transform shown in step 805. The processor then performs a de-mapping scheme and separates the signals as shown in step 806. The processor then averages the phase and amplitude in each PRB as shown in step 807. The system module 20 may then determine the anti error vectors as previously mentioned.

Figure 5:
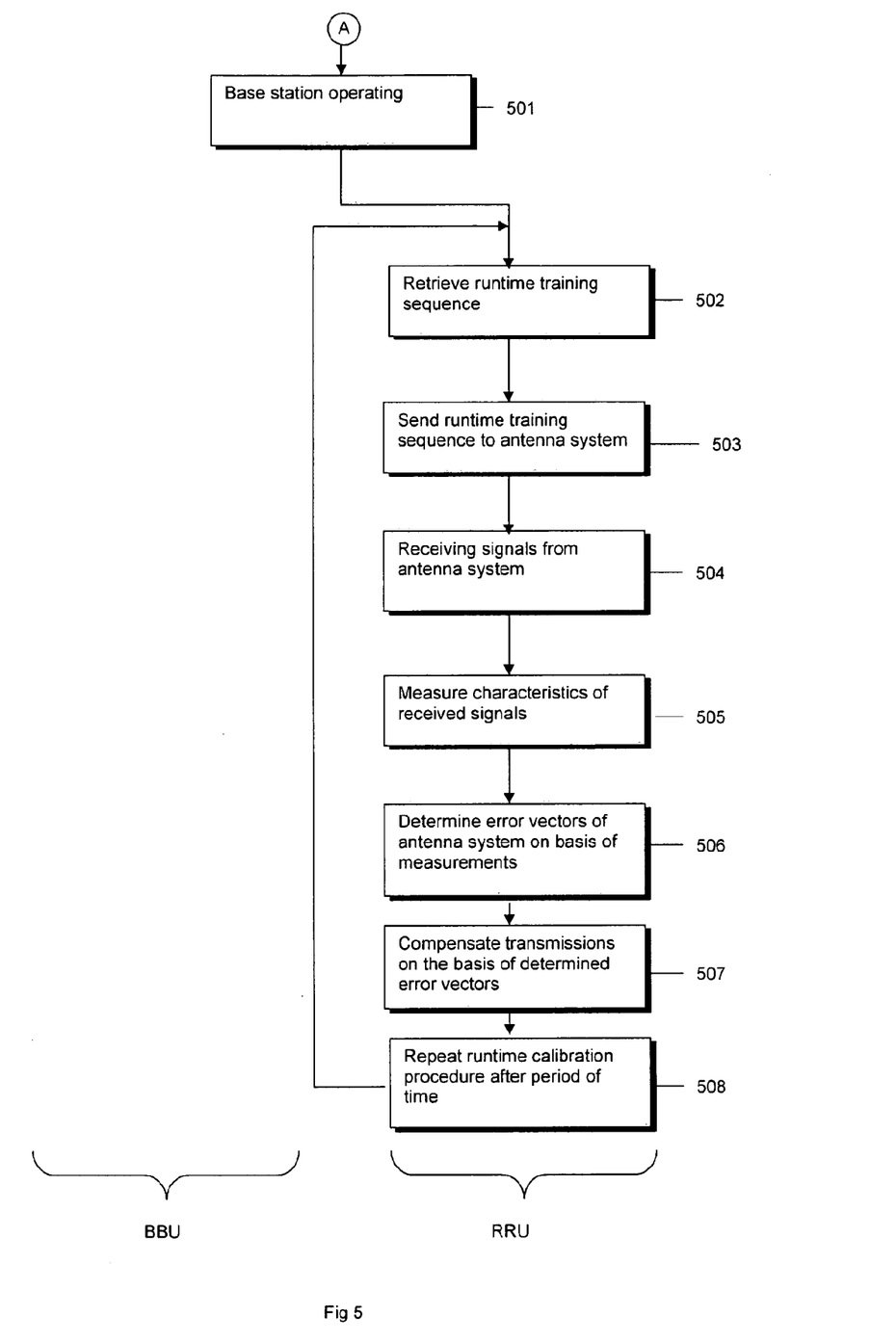
FIG. 5 illustrates a flowchart for a method of runtime calibration according to some embodiments.

The runtime calibration procedure for calibrating the base station 12 with respect to frequency selective characteristics which vary over time will now be described with respect to FIG. 2, FIG. 3 and FIG. 5. FIG. 5 shows a flow diagram for the method of runtime calibration according to some embodiments. The runtime calibration sequence is shown in box 320 of FIG. 3. The runtime calibration procedure is performed when the base station is operating as shown in step 501, for example, after the base station has started up.

The radio frequency module 21 comprises a timer 33 which determines a period of time between runtime calibration procedures. The timer 33 may be configured by the processor 28 and the periodicy of the calibration procedures during runtime of the base station 12 maybe altered. The base station 12 is operational during the runtime procedure and time after the base station has completed initialising. That is, the runtime calibration procedure is carried out anytime after the start-up calibration procedure. In some alternative embodiments there is no timer, but the processor 28 is configured to trigger the runtime calibration procedure in response to an event. For example, the processor can trigger the runtime calibration procedure in response to a certain time slot or information contained at a particular part of a frame.

When the timer 33 expires the processor 28 initiates the runtime calibration procedure. The processor 28 retrieves a runtime training sequence as set out in step 502.

The system module 20 uses the anti-error vectors determined in the start-up calibration procedure for generating the rune time training sequence for the run time calibration procedure. In this way the runtime training sequence has already been compensated for the fixed frequency selective characteristics determined in the start-up calibration procedure.

The radio frequency module 21 may receive the runtime training sequence from the system module 20 as shown in step 305 of FIG. 3. The radio frequency module 21 may store the runtime training sequence in memory 29 at a time prior to the runtime calibration procedure. In one embodiment, the radio frequency module 21 receives the runtime training sequence at the same time as the start-up training sequence from the system module 20. In some other embodiments, the radio frequency module 21 retrieves the runtime sequence from memory in step 305.

The processor 28 sends the runtime training sequence to the transmitting/receiving module 27 for sending to the antenna system 22. The runtime training signal is sent from the radio frequency module 21 to the antenna system 22 as shown in step 306 of FIG. 3.

Similar to the start-up calibration procedure the runtime training sequence is sent from the radio frequency module to be sent to a calibration loop or network of each pipe with a given power level as shown in step 503.

The runtime training sequence is transmitted from a first antenna of the plurality of antennas 23 to a second antenna of the plurality of antennas and the received signals are sent from the antenna system 22 to the radio frequency module 21 as shown in step 504 of FIGS. 5 and 307 of FIG. 3.

The received signals from the antenna system will comprise the runtime training sequences with error distortions because the training sequence has passed through the transmission and receiving chain of the base station 12. However, since the runtime training sequence has been compensated for the fixed errors, the received signals will comprise the runtime sequences which are distorted by only the variable errors.

The training sequence may be carried out for the whole operating bandwidth of the base station. In an alternative embodiment the training sequence may be sent and received for a plurality of sub-bands and different pipes. For example in one embodiment the training sequence may be used for 5 MHz sub-band with an operating bandwidth of 20 MHz. The runtime training sequence may be sent for each different pipe and sub-band in parallel or in sequence. The runtime calibration sequence is simpler than the start-up calibration sequence. For example, the runtime calibration procedure requires less sub-bands and therefore less iterations of processing in the calibration procedure. In this way there are less processing requirements for the runtime calibration procedure and means that the radio frequency module does not need upgrading to perform the runtime calibration procedure.

The transmitting/receiving module 27 of the radio frequency module 21 receives the distorted runtime training sequence from the antenna system 22 and passes the distorted runtime training sequence to the detection module. The detection module 31 measures the characteristics of the received signals as shown in step 505 and determines the amplitude, phase or latency errors of the received signals. The processor 28 determines the error vectors for the runtime calibration procedure. The processor 28 determines the error vectors for each of the configured sub-bands and each of the transmitting or receiving of pipes.

In some embodiments a plurality of sub-bands are used for runtime calibration and the processor 28 averages the error vectors for the plurality of sub-bands. In an alternative embodiment the runtime calibration procedure is performed for the whole operating bandwidth and no averaging step is required. The step of determining the error vectors of the antenna system on the basis of the measurements is shown in step 506.

The processor sends the error vectors to the compensation module 34 so that the compensation module 34 may determine the correction information or anti-error vectors for the variable errors as shown in step 507.

The compensation module 34 uses the anti error vectors determined from the runtime calibration procedure with user data I/Q samples in the time domain to compensate for the frequency selective characteristics varying over time in the radio frequency module 21. The user data I/Q samples are the data type and format received and transmitting between the system module 20 and the radio frequency module 21. The compensation module 34 carries out the compensation for the time varying frequency selective variations every time data is transmitted or received at the radio frequency module 21.

In some embodiments in a time duplex division system, such as long term evolution time duplex division mode (TDLTE) or code division multiple access (CDMA) standards such as time division synchronous code division multiple access (TDSCDMA), CDMA2000 and wideband code division multiple access (WCDMA),sthe sending and receiving of the training sequence as set out in steps 503 and 504 are carried out outside of the 3GPP downlink transmission and uplink receiving windows. Instead, a guard period is used for transmitting and receiving the runtime training sequence.

In some embodiments the radio frequency module receives the start-up error vectors which represent the fixed frequency selective variance determined during the start-up calibration procedure. The radio frequency module 21 receives the start-up error vectors from the system module 20 when the system module 20 sends the runtime training sequence to the radio frequency module 21. The radio frequency module 21 stores the start-up error vectors in memory 29. The runtime training sequence received from the system module 20 in some embodiments has not been compensated using the anti error vectors determined in the start-up calibration procedure. This means that the compensation module 34 uses the start-up error vectors when compensating for the variable frequency selective variances in order to avoid compensating for the fixed frequency selective variances more than once.

Once the compensation module 34 has compensated transmissions on the basis of the determined error vectors in the runtime calibration procedure, the timer 33 is reset.

The runtime calibration procedure is repeated as shown in step 508 when the timer 33 expires again. The repetition of sending the runtime training sequence to the antenna system shown in step 306 and receiving the distorted signal shown in step 307 is shown in FIG. 3 by the loop 330 which is triggered by timer 33. In this way the runtime calibration procedure of FIG. 5 is repeated. This means the variable error due to the variable frequency selective characteristics may be accounted for.

Figure 7:
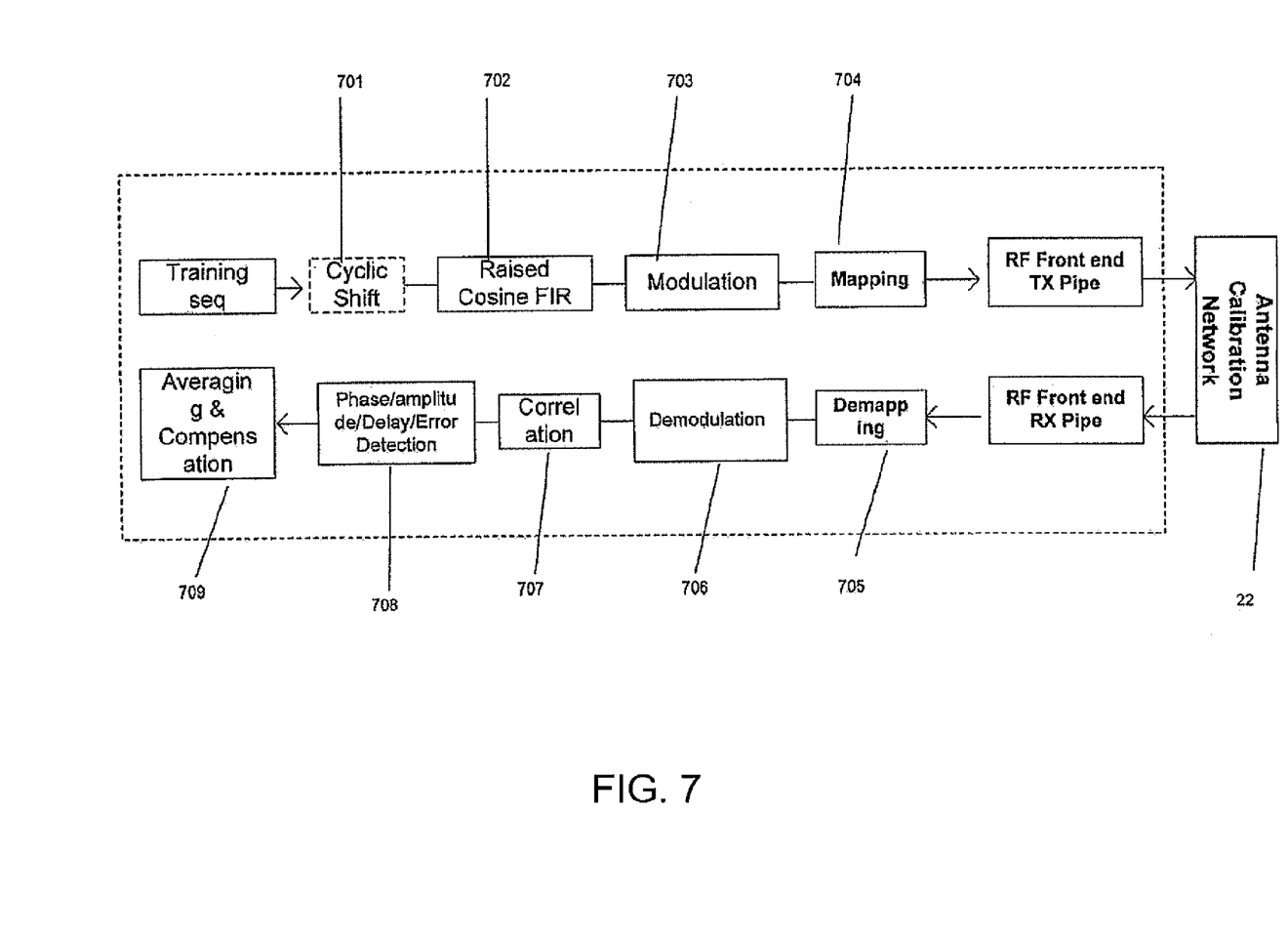
FIG. 7 illustrates a flowchart for runtime calibration according to some embodiments.

The runtime calibration procedure will now be discussed in further detail with reference to FIG. 7. FIG. 7 shows a more detailed flowchart of the runtime calibration procedure. The processor 28 receives the training sequence and applies a cyclic shift to the training sequence as shown in step 701. The cyclic shift is applied to the training sequences if the training sequences are not applied in sequence for each of the transmission and receiving pipes. The processor 28 then applies a raised cosine finite impulse response to the training sequences. The processor 28 then modulates and maps the training sequences as shown in step 703 and 704. The training sequences are then sent to the antenna system 22 and the distorted training sequences are de-mapped and demodulated as shown in step 705 and 706.

The training sequences are correlated as shown in step 707. The radio frequency module 21 then detects the phase amplitude and delay error as shown in step 708. The processor 28 then averages and determines the error vectors for use in the compensation module 34 as shown in step 709.

In some embodiments the start-up calibration procedure is initiated during runtime when required. If the start-up calibration procedure is required during runtime then the processor 24 is restricted to sending the start-up training sequence during a guard period. In some other embodiments the runtime calibration procedure may be deactivated when the start-up calibration procedure is initialised during runtime.

In some embodiments the start-up and runtime training sequences maybe fixed. This is because there is a finite number of training sequences with good auto correlation and cross correlation. In some embodiments the processor 24 of the system module 20 may generate a training sequence table offline and the training sequence table is stored in both the system module 20 and the radio frequency module 21. The system module 20 then sends an indication of a training sequence during the start-up calibration procedure. The indication of the training sequence may be a sequence index in the format of scalar, vector or matrix. This reduces the bandwidth demands between the system module 10 and the radio frequency module 21.

In some embodiments the base station is an eNode B. The eNode B has control of the uplink and downlink resource allocation and granting. In this way, the last one or two symbols from the downlink or uplink sub frame of the airframe are used in some embodiments as the runtime calibration period. Since the last symbol of the downlink or uplink sub frame is used for a training sequence a special code rate matching mechanism may be used so as not to reduce the downlink throughput. In one embodiment the less important bits after turbo coding may be mapped to a last symbol and hunched or replaced by the training sequence. In some embodiments the power for the last symbol in the airframe is transmitted with the power level as low as possible. Furthermore the antenna system and calibration network is configured so that it will loop back and return the last symbol comprising the training sequence to the receiving calibration chain instead of sending it out into the air.

In some embodiments in the uplink direction the last symbol which is used for sounding reference signals (SRS), which is an LTE uplink physical channel, or other purposes could be used to receive the calibration training sequence. The uplink m ac scheduler may need to make sure the last symbols are dedicated for the calibration and will not be used for any user uplink traffic.

The use of a start-up calibration procedure and a runtime calibration procedure provides better calibration performance achieved at lower cost. The runtime calibration procedure in the time domain may be provided at a coarse level and means that the field programmable gate array complexity can be reduced and hence the hardware cost of the radio frequency module is reduced. Since the runtime calibration procedure is carried out solely within the radio frequency module no requirement for changing the Ir interface is required. Furthermore no additional data or control messages are transmitted or received in the Ir interface during the period of a runtime calibration procedure. This means that it is easier to integrate a third party radio frequency module with a system module since there is no additional requirement on the runtime calibration procedure.

It is noted that whilst embodiments have been described in relation to LTE, similar principles can be applied to any other communication system where a carrier comprising a multiple of component carriers is employed. Also, instead of carriers provided by a base station a carrier comprising component carriers may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or'controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed in there is a further embodiment comprising a combination of one or more embodiments with any of the other embodiments previously discussed.

The invention claimed is:

1. A method of calibrating a base station comprising a plurality of antennas, the method comprising:
   receiving first correction information from a system module, the correction information determined from a first calibration of the base station;
   receiving at a radio frequency module signals received from at least one antenna of the base station; and
   determining second correction information on the basis of the received signals and the first correction information, wherein the received signals from the at least one antenna is a training sequence comprising signal distortions.

2. The method of claim 1, wherein the method comprises: receiving a training sequence from the system module; and sending the training sequence to the at least one antenna of the base station.

3. The method of claim 1, wherein receiving the first correction information comprises receiving correction information for correcting signal distortions or a training sequence modified on the basis of the correction information.

4. The method of claim 1, wherein the first correction information is an error vector for correcting a fixed error and the second correction information is an error vector for correction a variable error.

5. The method of claim 1, wherein the first correction information is determined during start up of the base station and the second correction information is determine after start up of the base station.

6. The method of claim 1, wherein the method comprises
   measuring the characteristics of the received signals in response to the training sequence; and
   the determining the second correction information comprises estimating the error distortion of the signals on the basis of the measurements.

7. The method of claim 1, wherein the training sequence is a start-up training sequence, a runtime training sequence, or both.

8. The method of claim 7, wherein the method comprises
   measuring, at at least one of the system module or the radio frequency module, the characteristics of the received signals in response to the start-up training sequence;
   estimating, at at least one of the system module or the radio frequency module, the error distortion of the signals on the basis of the measurements.

9. The method of claim 8, wherein the method comprises determining the first correction information on the basis of the estimated error distortion.

10. The method of claim 1, wherein the method comprises:
    compensating signals received / transmitted from the base station, the signals being distorted by characteristics of at least one of the plurality of antennas, on the basis of the second correction information, on the basis of the first correction information, or on the basis of both the second correction information and the first correction information.

11. The method of claim 10, wherein the compensating of the signals on the basis of the second correction information, on the basis of the first correction information, or on the basis of both the second correction information and the first correction information is carried out at at least one of the radio frequency module and the system module.

12. The method of claim 1, wherein the method comprises: repeating receiving the signals from the at least one antenna and determining the second correction information.

13. The method of claim 1, wherein the method comprises receiving first correction information for a first number of subbands and determining second correction information for a second number of subbands and the first number of subbands is greater than the second number of subbands.

14. The method of claim 13, wherein the bandwidth of at least one suband of the first number of subbands is smaller that the bandwidth of at least one subband of the second number of subbands.

15. 1 The method of claim 1, the determining comprises determining on or more of amplitude errors, phase errors or latency errors of signals.

16. A computer program product embodied on a non-transitory computer-readable medium in, which a computer program is stored that, when the program is run on a computer, is configured to provide instructions to control or carry out:
receiving first correction information from a system module, the correction information determined from a first calibration of the base station;
receiving a training sequence from the system module;
sending the training sequence to the at least one antenna of the base station;
receiving at a radio frequency module signals received from at least one antenna of the base station; and
determining second correction information on the basis of the received signals and the first correction information.

17. The computer program product of claim 16, wherein the received signals from the at least one antenna is a training sequence comprising signal distortions.

18. The computer program product of claim 16, wherein the first correction information is determined during start up of the base station and the second correction information is determine after start up of the base station.

19. An apparatus comprising:
a processor;
memory including computer program code;
the memory and the computer program code configured to, with the processor, cause the apparatus to perform at least the following:
receive first correction information from a system module, the correction information determined from a first calibration of the base station;
receive at a radio frequency module signals received from at least one antenna of the base station; and
determine second correction information on the basis of the received signals and the first correction information, wherein the first correction information is determined during start up of the base station and the second correction information is determine after start up of the base station.

20. The apparatus of claim 19, wherein the memory and the computer program code are further configured to, with the processor, cause the apparatus to perform at least the following:
receive a training sequence from the system module; and
send the training sequence to the at least one antenna of the base station.

21. The apparatus of claim 19, wherein receiving the first correction information comprises receiving correction information for correcting signal distortions or a training sequence modified on the basis of the correction information.

22. The apparatus of claim 19, wherein the first correction information is an error vector for correcting a fixed error and the second correction information is an error vector for correction a variable error.

23. The apparatus of claim 19, wherein the received signals from the at least one antenna is a training sequence comprising signal distortions.

24. The apparatus of claim 19, wherein the memory and the computer program code are further configured to, with the processor, cause the apparatus to perform at least the following:
measure the characteristics of the received signals in response to the training sequence.

25. The apparatus of claim 24, wherein the memory and the computer program code are further configured to, with the processor, cause the apparatus to perform at least the following:
determine the second correction information comprises estimating the error distortion of the signals on the basis of the measurements.

26. The apparatus of claim 19, wherein the training sequence is a start-up training sequence, a runtime training sequence, or both.

* * * * *